United States Patent
Cho et al.

(10) Patent No.: US 6,853,624 B2
(45) Date of Patent: Feb. 8, 2005

(54) METHOD FOR CALIBRATING SIGNAL PROPAGATION DELAY IN NETWORK TRUNK

(75) Inventors: Yu-Wen Cho, Hsinchu (TW); Chi-Hao Chang, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 782 days.

(21) Appl. No.: 09/726,318

(22) Filed: Dec. 1, 2000

(65) Prior Publication Data

US 2002/0097753 A1 Jul. 25, 2002

(51) Int. Cl.[7] .......................... G01R 31/08; H04L 12/28; H04J 3/06
(52) U.S. Cl. .................. 370/252; 370/401; 370/519
(58) Field of Search .................. 370/252, 250, 370/235, 401, 519, 498

(56) References Cited

U.S. PATENT DOCUMENTS 6,556,577 B2 * 4/2003 Hjalmtysson et al. ....... 370/410
6,631,141 B1 * 10/2003 Kumar et al. ............... 370/469
6,687,751 B1 * 2/2004 Wils et al. ................... 709/230

* cited by examiner

*Primary Examiner*—Duc Ho
(74) *Attorney, Agent, or Firm*—Bacon & Thomas, PLLC

(57) ABSTRACT

A method for calibrating a propagation delay in a network trunk includes the step of calculating a time period Ti in a first network switch between sending a marker and receiving a trunk package acknowledgement marker from the second network switch, and a time period Tt in the second switch between receiving the trunk package and the marker and transmitting an acknowledgement marker containing the trunk package back to the first switch, the second switch appending the time period Tt to the acknowledgement marker before sending it back to the first switch. The time gap is read and a time delay caused by sending the trunk package on each channel is calculated. The second switch decodes the received trunk package and calibrates the propagation delay based on the time delay to determine a time gap between the packages in the same channel.

6 Claims, 2 Drawing Sheets

METHOD FOR CALIBRATING SIGNAL PROPAGATION DELAY IN NETWORK TRUNK

FIELD OF THE INVENTION

The present invention relates to network and more particularly to a method for automatically calibrating signal propagation delay in a network trunk.

BACKGROUND OF THE INVENTION

The number of channels for transmitting information has been significantly increased since the rapid development of local area network (LAN) and the Internet in the recent years. As a result, the speed and quality of information transmission are also improved. Further, the cost of information transmission is lowered as the price of high performance computer is lowered. This also greatly increases the convenience and generality of information transmission. Now it is common to transmit information through network within an organization or between two organizations. Conventionally, for the purpose of increasing the transmission rate of network, a network manufacturer may aggregate a plurality of low transmission speed signal lines in the network to form a trunk through a network switch system. This trunk may further form a line having wider bandwidth. As a result, the transmission rate and efficiency of a conventional network system is increased through the network switch system. The technique of aggregating a plurality of low speed signal lines is called link aggregation.

A typical network switch system aimed at fulfilling above need is illustrated in FIG. 1. As shown, network switch system 10 comprises ten 10 Megabit network lines (i.e., a trunk) 20, a first network switch 11, and a second network switch 12. In operation, a data stream containing packages is sent from terminal 4 in one computer to first network switch 11. At first network switch 11, a numbering of data stream is performed prior to sending to one of a variety of channels formed by the trunk 20. The packages are further sent to second network switch 12 at a rate of about 100 Megabit per second. At second network switch 12, a decoding is performed on the package for obtaining an original data stream. Finally, a data stream containing the original packages is sent to terminal 3 in another computer. This completes the transmission of data package. Theoretically, above technique may increase the transmission rate and efficiency of a conventional network system. In fact, however, as specified by IEEE 802.3ad it is not allowed to fragment a data package in a trunk into a plurality of sub packages in the network switch system during transmitting. This regulation may force a network designer to sacrifice the increase of transmission rate for maintaining the integrity of data package during transmitting in designing such network switch system.

Referring to FIG. 2, in the FIG. 1 network switch system, first network switch 11 may number each of 12 packages in data stream A to be transmitted. Thereafter, the packages are sent to 10 channels formed by trunk 20. The packages are further sent to second network switch 12 at a rate of about 100 Megabit per second. As shown, number 1 package is the longest. As such, the time occupied by the number 1 package at channel is the longest. Likewise, number 7 package is the shortest. As such, the time occupied by the number 7 package at channel is the shortest. As such, when number 7 package arrives at second network switch 12, the number 1 package still occupies the channel for waiting to transmit. As such, second network switch 12 must wait a predetermined period of time until all data packages in the same trunk are received. Then, a decoding may be performed on the packages. For the integrity of data during transmitting, the longest package of a previous trunk is taken as a base for processing a trunk next to receive. Further, first network switch 11 sends packages at the same timing clock. This may create a time delay Td between two adjacent packages in each channel. As a result, a desired transmission rate is not achievable by such network system.

Referring to FIG. 3, this diagram shows packages of each trunk sent at different timing clocks in the network switch system. The first network switch 11 sets the head of each package of a data stream as a base. Further, a time gap Ts is inserted in the end of each package of a trunk. The second network switch 12 may identify each package of various trunks in the same channel based on the time gap Ts. However, the previous design suffered from a disadvantage. For example, first and second network switches 11 and 12 are interconnected by a signal line (e.g., twisted pair line) for configuring the network switch system. Thus, it tends to create different propagation delays in each formed channel 20 due to the length difference between signal lines. As such, second network switch 12 may not be able to correctly identify the time gap Ts. And in turn, the network system may not correctly number the packages. As a result, a uniform receiving of packages is not achievable. At this condition, a software tool at upper layer having the sorting capability is required to perform the unfinished task. Otherwise, the ordering of packages in trunk may not be maintained. As a result, it tends to cause error in identifying and transmitting data packages.

SUMMARY OF THE INVENTION

It is an object of the present invention to provide a method for calibrating a propagation delay in a network trunk comprising the steps of: (a) providing a counter in each of first and second network switches in a network switch system; (b) each counter calculating a time period Ti from sending a marker in the first network switch until receiving a trunk package acknowledgement marker from the second network switch, and a time period Tt from receiving the trunk package and the marker in the second network switch until generating an acknowledgement marker containing the trunk package; (c) commanding the second network switch to append the time period Tt to the acknowledgement marker prior to sending the acknowledge marker back to the first network switch; (d) reading out the time gap Tt after the first network switch has received the acknowledgement marker; and (e) calculating a time delay Tx by an equation Tx=(Ti−Tt)/2 wherein the time delay Tx is caused by sending the trunk package on each channel between the first and the second network switches.

It is another object of the present invention to provide a method for calibrating a propagation delay in a network trunk wherein the second network switch is operable to decode the received trunk package for calibrating the propagation delay based on the time delay Tx in order to determine a time gap between the packages in the same channel, thereby obtaining a correct data stream from the trunk package.

The above and other objects, features and advantages of the present invention will become apparent from the following detailed description taken with the accompanying drawings.

Table I lists the specifications of the markers required by IEEE 802.3ad.

DETAILED DESCRIPTION OF THE PREFERRED EMBODIMENTS

Figure 1:
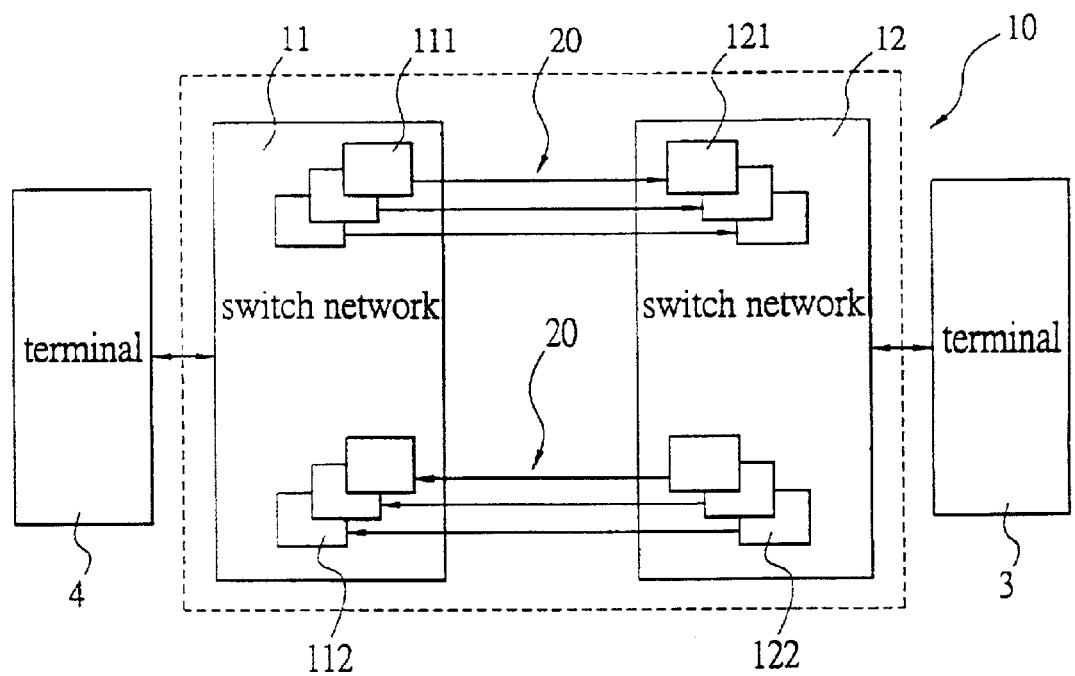
FIG. 1 is a diagram illustrating a typical network switch system.
Figure 2:
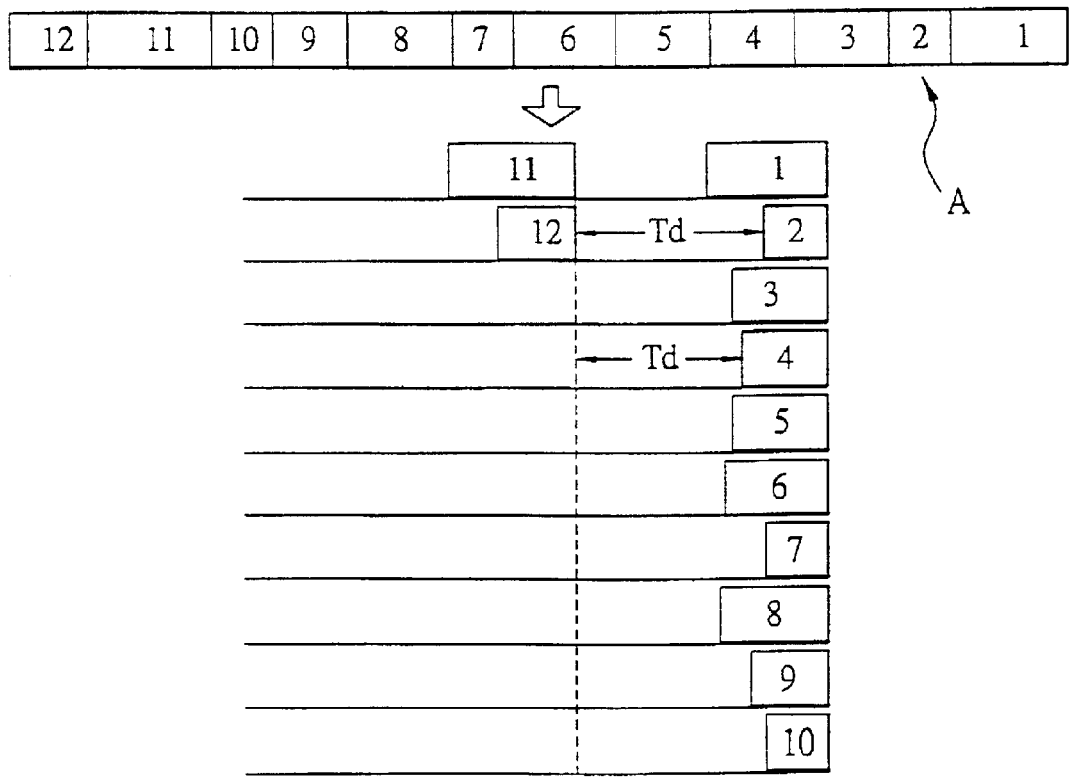
FIG. 2 is a diagram showing packages of each trunk sent at the same timing clock in the FIG. 1 network switch system.
Figure 3:
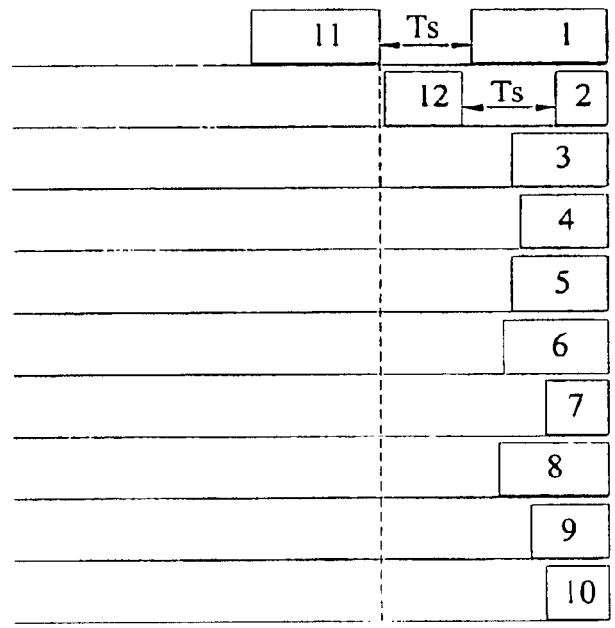
FIG. 3 is a diagram showing packages of each trunk sent at the different timing clocks in the FIG. 1 network switch system.
Figure 4:
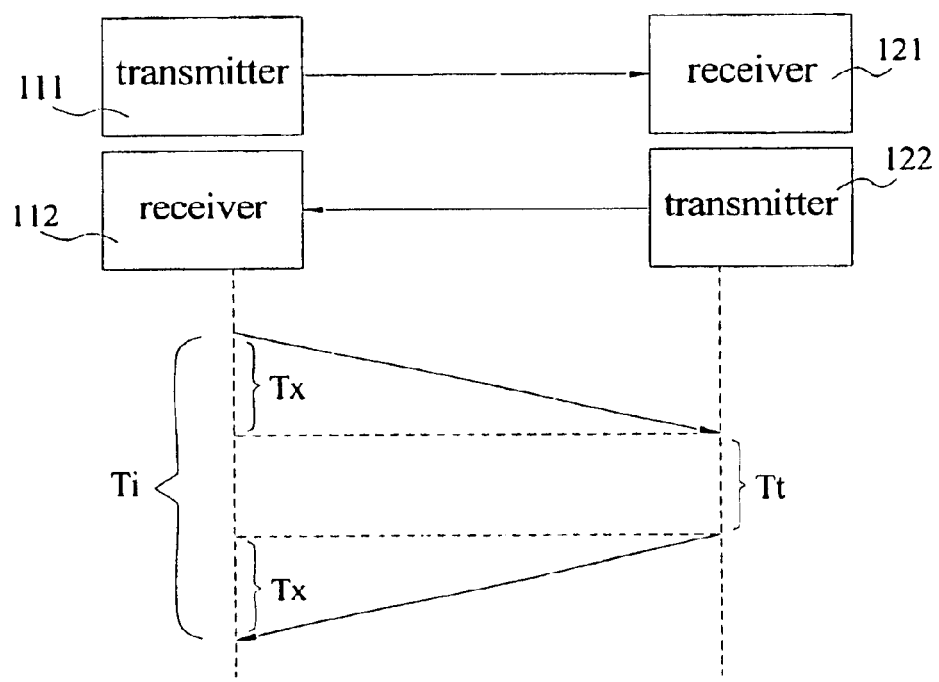
FIG. 4 is a diagram showing a technique for calibrating signal propagation delay in network trunk according to the invention.

Referring to FIGS. 1 to 4, the method for calibrating signal propagation delay in network trunk in accordance with the invention is detailed below. In a network switch system employing the link aggregation technique, first switch network 11 sends a data stream through a plurality of nodes thereon by trunk. Moreover, data packages are sent to corresponding nodes of second network switch 12 through a variety of channels formed by at least one network line (e.g., twisted pair line) 20. Transmitter 111 on each node of first network switch 11 is required by IEEE 802.3ad to send a marker as listed in Table I.

As such, the marker may be sent to a corresponding receiver 121 on each node of second network switch 12 through network line 20. After the receiver 121 received all data stream sent from the transmitter 111, an acknowledgement marker is then sent back from each node of second network switch 12 through a transmitter 122 thereon as required by IEEE 802.3ad. The sent acknowledgement marker is finally sent to a corresponding receiver 112 on each node of first network switch 11 through the network line 20, thus completing the receiving of the data packages. Based on regulation specified by IEEE 802.3ad with respect to sending data packages of each trunk in network system, two interconnected network switches 11, 12 are required to generate a marker and an acknowledgement marker through transmitter and receiver respectively. Whereby, network switches 11, 12 may perform a communication of transmitting and receiving data stream. As to this communication (see FIG. 4), it is seen that time Tt of first network switch 11 is the same as that of second network switch 12 in transmitting and receiving the same package in a data stream. Further, the time Tx needed for a marker, generated in one network switch, sent from one network switch to the other network switch through network line 20 is the same as a marker, generated in the other network switch, sent from the other network switch to one network switch through network line 20. As such, time delay Tx caused by sending data stream on network line 20 can be calculated as below:

$$Tx=(Ti-Tt)/2 \quad (1)$$

where Ti is the time period from sending a marker in one network switch until receiving an acknowledgement marker from the other network switch. By utilizing this concept, a counter is provided in each of network switches 11, 12 in accordance with the invention. Counter acts to calculate time period Ti, i.e., as stated above from sending a marker in first network switch 11 until receiving an acknowledgement marker from second network switch 12 as well as the time period Tt, i.e., from receiving the marker in second network switch 12 until generating an acknowledgement marker therein. Also, second network switch 12 is commanded to append the time period Tt to an acknowledgement marker prior to sending the acknowledgement marker back to first network switch 11. As such, time gap Tt may be read out after first network switch 11 has received the acknowledgement marker. Finally, time delay Tx may be calculated by equation (1) Tx=(Ti−Tt)/2.

Moreover, a register is provided in each of network switches 11, 12 in accordance with the invention in order to record the propagation delay caused by line 20 corresponding to node n in each of network switches 11, 12. Also, a maximum propagation delay Tmax occurred in line 20 by both network switches 11 and 12 is set as base for calibrating internal propagation delay. It is possible to derive equation (2) by utilizing Tmax:

$$Ts(n)=Tmax-Tx(n) \quad (2)$$

where Tx(n) is propagation delay of line 20 corresponding to each node n. Thus, calibration value of propagation delay Ts(n) is obtained. With Ts(n), it is possible to decode each received data package in second network switch 12 so as to calibrate the propagation delay. Therefore, it is possible to determine time gap Ts between packages in the same channel. Finally, a correct data stream is obtained, thus finishing the transmission of data package.

With this, when packages of each trunk sent at different timing clocks in the network switch system, each network switch may correctly identify time gap Ts by calculating propagation delay Tx(n) of line 20 corresponding to each node n. As such, a uniform receiving of packages is achieved as well as the receiving order of each package in data stream is maintained. As a result, it is impossible to cause transmission error in identifying and transmitting data package.

While the invention has been described by means of specific embodiments, numerous modifications and variations could be made thereto by those skilled in the art without departing from the scope and spirit of the invention set forth in the claims.

| Marker PDU | Octets | Marker Response PDU |
|---|---|---|
| Destination Address | 6 | Destination Address |
| Source Address | 6 | Source Address |
| Length/Type | 2 | Length/Type |
| Subtype = Marker | 1 | Subtype = Marker |
| Version Number | 1 | Version Number |
| TLV_type = Marker Information | 1 | TLV_type = Marker Response Information |
| Marker_Information_Length = 16 | 1 | Marker_Response_Information_Length = 16 |
| Requester_Port | 2 | Requester_Port |
| Requester_System | 6 | Requester_System |
| Requester_Transaction_ID | 4 | Requester_Transaction_ID |
| Pad = 0 | 2 | Pad = 0 |
| TLV_type = terminator | 1 | TLV_type = terminator |
| Terminator_Length = 0 | 1 | Terminator_Length = 0 |
|  | 1 |  |
| Clock_Counter = 0 | 2 | Clock_Counter = n |
| RESERVED | 88 | RESERVED |
| FCS | 4 | FCS |

What is claimed is:

1. A method for calibrating a propagation delay in a network trunk comprising the steps of:

(a) providing a counter in each of first and second network switches in a network switch system;

(b) each counter calculating a time period Ti that begins when the first network switch transmits a trunk package and marker to the second network switch and that ends when the first network switch receives a trunk package acknowledgement marker from the second network switch, and a time period Tt that begin when the second network switch receives the trunk package and the marker from the first network switch and that ends when the second network switch transmits an acknowledgement marker containing the trunk package back to the first network switch;

(c) commanding the second network switch to append the time period Tt to the acknowledgement marker prior to sending the acknowledgement marker back to the first network switch;

(d) reading out the time period Tt after the first network switch has received the acknowledgement marker; and (e) calculating a time delay Tx after reading out the time period Tt by an equation Tx=(Ti−Tt)2 wherein the time delay Tx is caused by sending the trunk package on each of a plurality of channels between the first and the second network switches.

2. The method of claim 1, wherein the second network switch is operable to decode the trunk package received in step (b) by the second network switch for calibrating the propagation delay based on the time delay Tx in order to determine a time gap between the packages in the same channel, thereby obtaining a correct data stream from the trunk package.

3. The method of claim 1, further comprising a plurality of nodes n in the interconnected first and second network switches, wherein each node n in the interconnected first and second network switches is operable to generate a marker in the first network switch and an acknowledgement marker in the second network switch through a transmitter and a receiver therein respectively, whereby, the node in the first network switch is capable of performing a communication of transmitting and receiving the package with respect to the node in the second network switch.

4. The method of claim 3, further comprising a register in each of the first and second network switches for recording the propagation delay caused by a line corresponding to the node in each of the first and second network switches.

5. The method of claim 4, wherein the maximum propagation delay Tmax occurring in the line by both the first and second network switches is set as base for calibrating the internal propagation delay, whereby an equation Ts(n)= Tmax−Tx(n) is derived by utilizing the Tmax where Tx(n) is a propagation delay of the line corresponding to each node N and a calibration value of the propagation delay Ts(n) is obtained.

6. The method of claim 5, wherein each of the first and second network switches decodes each received data package based on the calibration value of the propagation delay Ts(n) for calibrating the propagation delay caused by the line corresponding to the node in each of the first and second network switches, whereby a time gap Ts between the packages in the same channel is determined and the correct data stream is obtained.

* * * * *